(12) United States Patent
Xu

(10) Patent No.: US 9,030,947 B2
(45) Date of Patent: May 12, 2015

(54) METHODS FOR ZERO LOSS AND NONSTOP PACKET PROCESSING DURING SYSTEM SOFTWARE UPGRADES

(71) Applicant: Futurewei Technologies, Inc., Plano, TX (US)

(72) Inventor: Jun Xu, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 118 days.

(21) Appl. No.: 13/650,363

(22) Filed: Oct. 12, 2012

(65) Prior Publication Data

US 2014/0105068 A1  Apr. 17, 2014

(51) Int. Cl.
  *G01R 31/08* (2006.01)
  *G06F 9/445* (2006.01)
  *H04L 12/771* (2013.01)
  *H04L 29/08* (2006.01)

(52) U.S. Cl.
  CPC .............. *G06F 8/65* (2013.01); *H04L 45/563* (2013.01); *H04L 67/34* (2013.01)

(58) Field of Classification Search
  CPC ............ G06F 8/65; G06F 8/67; G06F 9/4416
  USPC .................. 370/248–249, 252, 254
  See application file for complete search history.

(56) References Cited

U.S. PATENT DOCUMENTS

| 8,578,007 B1 * | 11/2013 | Yellai et al. ................... 709/221 |
| 2003/0055926 A1 * | 3/2003 | Kwok et al. ................... 709/221 |
| 2006/0070054 A1 * | 3/2006 | Naik et al. ................... 717/165 |
| 2007/0162565 A1 * | 7/2007 | Hanselmann ................ 709/219 |
| 2011/0231833 A1 * | 9/2011 | Narayanan et al. .......... 717/171 |
| 2012/0072893 A1 * | 3/2012 | Gupta et al. ................. 717/168 |

FOREIGN PATENT DOCUMENTS

| CN | 101547082 A | 9/2009 |
| CN | 101697128 A | 4/2010 |
| CN | 101968744 A | 2/2011 |
| CN | 102436390 A | 5/2012 |

OTHER PUBLICATIONS

"NE40E Universal Service Router," http://www.huawei.com/ucmf/groups/public/documents/attachments/hw_132368.pdf, Huawei, 7 pages.

"Cisco IOS High Availability (HA)—In-Service Software Upgrade (ISSU), Technical Overview," Cisco Systems, 2006, 24 pages.

"Cisco ASR 1000 Series Aggregation Services Routers: ISSU Deployment Guide and Case Study," Cisco Systems, 2008, 10 pages.

(Continued)

*Primary Examiner* — Redentor Pasia

(74) *Attorney, Agent, or Firm* — Conley Rose, P.C.; Grant Rodolph; William H. Dietrich

(57) ABSTRACT

A method implemented in a network component for an in-service software upgrade (ISSU), the method comprising selecting a forwarding core (FC) for upgrade from a plurality of FCs that run at a data plane on a printed circuit board of the network component to process and forward a plurality of packets, and resetting the selected FC with a software upgrade, wherein at least one of the other FCs continues processing and forwarding packets when the selected FC is upgraded.

18 Claims, 6 Drawing Sheets

(56) References Cited

OTHER PUBLICATIONS

Foreign Communication From A Counterpart Application, PCT Application No. PCT/CN2013/085138, International Search Report dated Jan. 16, 2014, 6 pages.

Foreign Communication From a Counterpart Application, PCT Application No. PCT/CN2013/085138, Written Opinion dated Jan. 16, 2014, 4 pages.

* cited by examiner

METHODS FOR ZERO LOSS AND NONSTOP PACKET PROCESSING DURING SYSTEM SOFTWARE UPGRADES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some network devices require high reliability, such as in carrier networks and large enterprise networks. In such networks, the network connectivity uptime may exceed about 99 percent, including system planned software upgrades and unplanned downtime. Due to ongoing feature upgrades and new software releases from vendors of network devices, the network devices may need a planned software upgrade during device operation, also referred to herein as in-service software upgrade (ISSU). The industry has adopted different ISSU schemes to reduce system or device downtime during a planned ISSU.

In one ISSU scheme, the network device comprises dual printed circuit boards (or dual line cards) or implements a control plane upgrade but not a data plane upgrade. The ISSU involves loading the new software or software upgrade (for the control plane) on one of the dual boards while continuing to run the previous software version on the other board. When the upgrade is completed, the device may switch to the board with the new loaded software or software upgrade. This ISSU scheme is described in "Cisco IOS High Availability (HA)—In-Service Software Upgrade (ISSU)", 2006, by Cisco Systems, Inc., which is incorporated herein by reference. In another ISSU scheme, the network device comprises dual data plane boards and/or dual control plane boards that can be used to load upgrades for the data plane and/or the control plane and switch from the previous versions to the upgraded versions. However, based on this scheme, the network devices need to double system resources for the dual boards and may still suffer short delays or downtime during the switching between boards. Further, supporting stateful features for ISSU can be complicated and have high costs using this scheme. This ISSU scheme is described in "Cisco ASR 1000 Series: ISSU Deployment Guide and Case Study", 2008, by Cisco Systems, Inc. and in "NE40E Universal Service Router", by Huawei, which are incorporated herein by reference. The ISSU schemes above may increase system cost and complexity associated with using dual boards. Further, the underlying systems and devices using such schemes may still experience some impact on system services, such as some packet processing and forwarding delays, during planned downtime for software upgrade.

SUMMARY

In one embodiment, the disclosure includes a method implemented in a network component for an ISSU, the method comprising selecting a forwarding core (FC) for upgrade from a plurality of FCs that run at a data plane on a printed circuit board of the network component to process and forward a plurality of packets, and resetting the selected FC with a software upgrade, wherein at least one of the other FCs continues processing and forwarding packets when the selected FC is upgraded.

In another embodiment, the disclosure includes a network component comprising a printed circuit board comprising a plurality of FCs, wherein each of the FCs is configured to handle and forward packets, and a processor coupled to the plurality of FCs and configured to select a FC from the plurality of FCs, switch off the selected FC to stop forwarding packets, upload an upgraded FC software version for the selected FC, allocate new resources to the selected FC, configure the selected FC to join packet handling and forwarding with the other running FCs on the printed circuit board, and switch on the selected FC after configuring the selected FC, wherein at least one of the FCs is configured to forward packets while the selected FC is switched off.

In yet another embodiment, the disclosure includes a network component comprising a processing board comprising at least one processor configured to run a controller at a control plane and a plurality of FCs at a data plane, wherein each of the plurality of FCs are configured to process and forward a plurality of packets, and wherein the controller is configured to switch off one or more of the FCs for upgrade while at least one or more remaining FCs process and forward packets.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatuses for providing an ISSU for network components, such as routers or similar data forwarding components. The disclosed ISSU scheme may use single printed circuit board (also referred to as a board or PCB) or single line card systems or architectures and may have reduced cost and complexity than previous ISSU schemes that use dual-board systems or architectures. ISSU as described herein may be implemented for network components that comprise one or more processors or central processing units (CPUs) with a multi-core architecture, i.e., where each CPU or processing chip may run a plurality of cores for processing and forwarding packets. Instead of resetting the cores for packet processing and forwarding by switching between dual boards, as done in other ISSU schemes, the proposed ISSU may arbitrarily or sequentially manage the individual cores of the single-board system to upgrade a running software without interrupting packet forwarding by all the cores. Specifically, the ISSU may handle one core at a time while keeping the other cores on the board processing packets and handling data forwarding. By upgrading each core at a time as such, the multi-core board for the forwarding component may achieve ISSU with non-stop packet processing and forwarding. Advantages of the proposed ISSU include zero or substantially no packet loss during the ISSU procedure, reducing the system downtime for planned upgrade, simpler system ISSU steps in comparison to other ISSU schemes, and saving system resources and hence cost by using a single processing board instead of dual boards.

Figure 1:
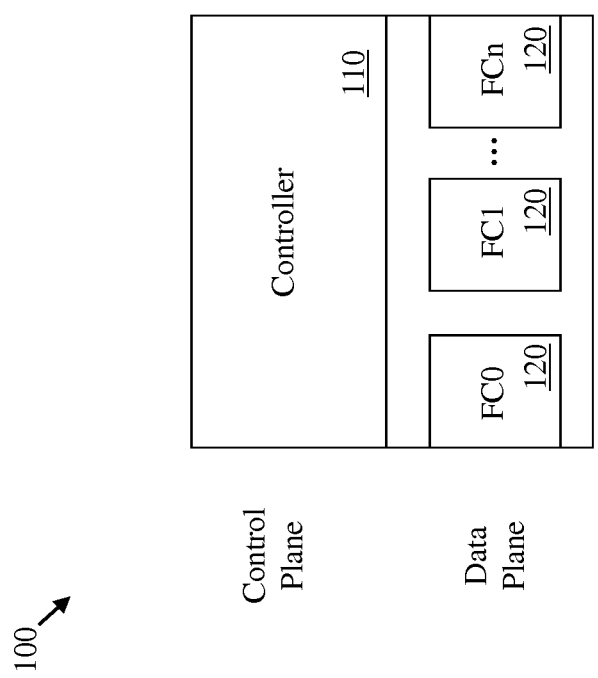
FIG. 1 is a schematic diagram of an embodiment of a multi-core forwarding architecture.

FIG. 1 illustrates an embodiment of a multi-core forwarding architecture 100 that may be used for handling, processing, and forwarding packets or data in a network. The multi-core forwarding architecture 100 may be part of, located at, or coupled to a network component, such as a router, a switch, a bridge, or any other data processing/forwarding components. The network component may comprise a single board or line card (LC) that comprises one or more CPUs or processors, such as a multi-core processor, which may implement the multi-core forwarding architecture 100. The multi-core forwarding architecture 100 may comprise a controller 110 that corresponds to a control plane and a plurality of forwarding cores (FCs) 120 that correspond to a data plane. For example, the multi-core forwarding architecture 100 may comprise an integer number n+1 of FCs 120 labeled FC0 120 to FCn 120 in FIG. 1. The controller 110 and the FCs 102 may be implemented using software components (e.g., software programs) that run on the one or more CPUs. The controller 110 may run at the control plane or layer for managing and controlling the FCs 120. The FCs 120 may run at the data plane or layer for handling, processing, and forwarding the data or packets.

Figure 2:
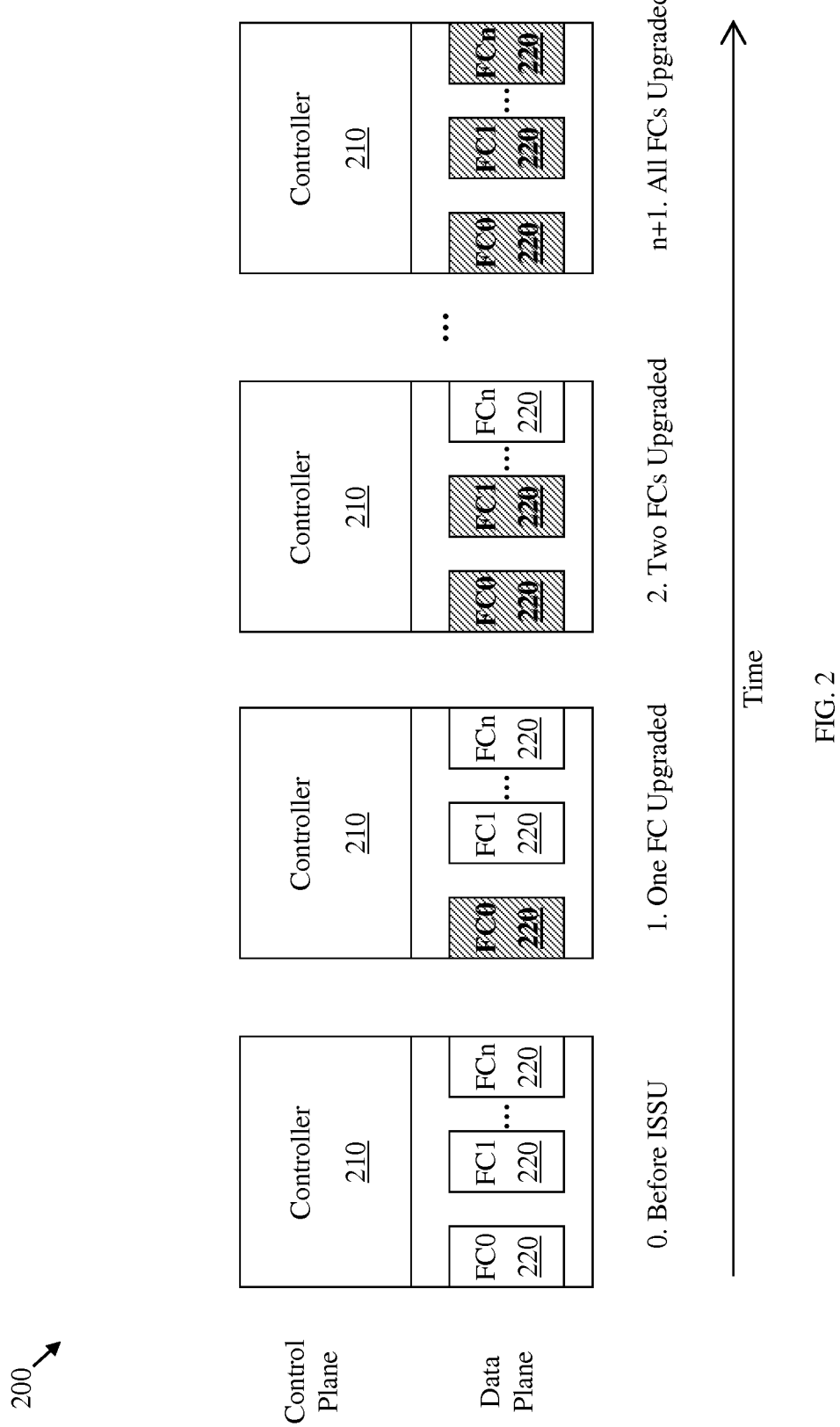
FIG. 2 illustrates an embodiment of an ISSU scheme for a multi-core forwarding architecture.

FIG. 2 illustrates an embodiment of an ISSU scheme 200 that may be implemented for a multi-core forwarding architecture, such as the multi-core forwarding architecture 100. The ISSU scheme 200 may be used to upgrade a plurality of FCs 220 at the data plane (e.g., upgrade the FC software versions) of the multi-core forwarding architecture. The FCs 220 may be similar to the FCs 120. The ISSU scheme 200 may achieve a nonstop ISSU where at least some of the FCs 220 may be handling, processing, and forwarding data or packets at any time during the ISSU. The FCs 220 may be switched offline and upgraded one or few at a time, while one or more of the FCs 220 remain running and handling data (at the data plane).

Initially, a plurality of n+1 FCs 220 (labeled FC0 220, FC1 220, . . . , FCn 220) may be running prior to the ISSU. During the ISSU, a controller 210 of the multi-core forwarding architecture may switch one of the running FCs 220, for example FC0 220, offline and release the FC's 220 resources, such as allocated memory, processing power, and input/output connections. The FC 220 may be selected arbitrarily, based on its status such as the amount of packets or load handled by the FC 220, or according to some predetermined order or sequence of the FCs 220. In this example, FC0 220 is selected first. After the FC0 220 is offline, the controller 210 may begin updating or upgrading the offline FC0 220. The upgrade process may comprise specifying one or more options for the forwarding process to restart on the offline FC0 220, for example including the boot image, version checks, and/or data structure checks. When all the checks pass and software upgrade for the offline FC0 220 is completed successfully, the controller 210 may allocate new resources for the FC0 220 and allow the newly loaded and upgraded FC0 220 to join packet handling and processing with the other online FCs 220 (e.g., FC1 220, . . . , FCn 220).

After upgrading one FC 220 as such, the controller 210 may follow the same procedure to upgrade the other remaining FCs 220 one at a time, for example sequentially in some order, until all the FCs 220 are upgraded. For example, the controller 210 may next switch FC1 220 offline, upgrade FC1 220 (e.g., perform FC software upgrade), and load the newly upgraded FC1 220 to start running at the data plane and handling packet forwarding. The controller 210 may continue upgrading the remaining FCs 220, e.g., FC2 220 to FCn 220, one by one in a similar manner until all the FCs 220 of the multi-core forwarding architecture are upgraded. FIG. 2 shows the progress of the ISSU procedure at multiple stages over time, where the FCs 220 upgraded as time progresses are shown as shaded blocks in FIG. 2.

In some embodiments, if the system processing capability is sufficient, e.g., if the system comprises enough PCUs or processors on the board or LC and/or other necessary system resources, the system may have more than one FC 220 going through the ISSU procedure described above. For instance, the controller 210 may instruct two or more of the FCs 220 to stop processing packets and start upgrading the selected FCs 220 at about the same time. The selected FCs 220 may be upgraded independently or without substantial synchronization. While some of the FCs 220 are being upgraded, the system may have enough remaining FCs 220 that are running to process packet forwarding and prevent packet loss.

In the ISSU scheme 200, the individual FCs 220 may be managed by the controller 210 at the control plane to transition from running (on the one or more CPUs of the single board) to suspended temporarily. While running, a FC 220 may be polling packets from a buffer for packet processing and/or responding to an input/output (IO) interrupt. The packet buffer and the IO interrupt may be shared by all or a plurality of FCs 220 on the board. When the controller 210 sends a reset command to upgrade a selected FC 220, the FC 220 may stop polling packets from the shared buffer, for example after completing the processing its pending packets. The selected FC 220 may also stop responding to the IO interrupt, e.g., after completing any pending packet processing. However, the remaining running FCs 220 may not be affected by the controller 210 reset command to the selected FC 220 and continue their normal processing from the shared buffer and/or IO interrupt. Thus, the suspension of the selected FC 220 may not cause packet loss or substantial packet processing delay, where packets may continue to be handled by the remaining running FCs 220.

In some cases, the selected FC 220 may still need more packets to complete its own packet processing, such as in the case of Internet Protocol (IP) defragmentation, Transmission Control Protocol (TCP) sequence, or other transmission schemes, the selected FC 220 may continue polling the needed packets from the shared buffer after receiving the reset command from the controller 210. The selected FC 220 may poll the packets from the buffer until the FC 220 completes its own packet processing using the needed packets and subsequently stop its normal processing from the shared buffer. Consequently, there will be no dropped packets. Alternatively, instead of completing its own packet processing, the selected FC 220 may queue the polled packets to a dedicated second shared packet buffer or queue for other running FCs 220 to pick up and process. The system may treat this second dedicated buffer or queue as a high priority queue for packet processing, where other running FCs 220 may pick up the packets in the queue for high priority processing.

After the selected FC's 220 own packet processing is completed, the FC 220 may release other shared resources that were used by this FC 220, e.g., locks, table entries, data structures, memory, or other shared resources. The controller 210 may assist the FC 220 in freeing the associated resources, including the packet buffer and any associated data structures, memory, locks, or combinations thereof. The selected FC 220 may take a bounded but not strictly defined cycle to complete the tasks above. After the selected FC 220 releases the resources, the FC 220 may self-pace itself to implement the next steps of the ISSU procedure. After the shared resources are released, the FC 220 may go through a plurality of upgrade steps independent for the other running FCs 220, e.g., reboot and initialize, to restart with a new software version during its software upgrade. The other running FCs 220 may continue in the running state until being instructed or managed by the controller 210 to reset for upgrade, and thus the system as a whole may continue processing packets without stopping.

The FC 220 upgraded with the new software version may then start to access the shared buffer and/or IO interrupt and poll packets for its own processing and forwarding. At this stage, the upgraded FC 220 may perform its normal packet forwarding function(s), while the system as a whole may still be undergoing the ISSU procedure (i.e., while one or more other FCs 220 may be upgraded). The controller 210 and the FC software versions may be compatible before and after the ISSU.

Figure 3:
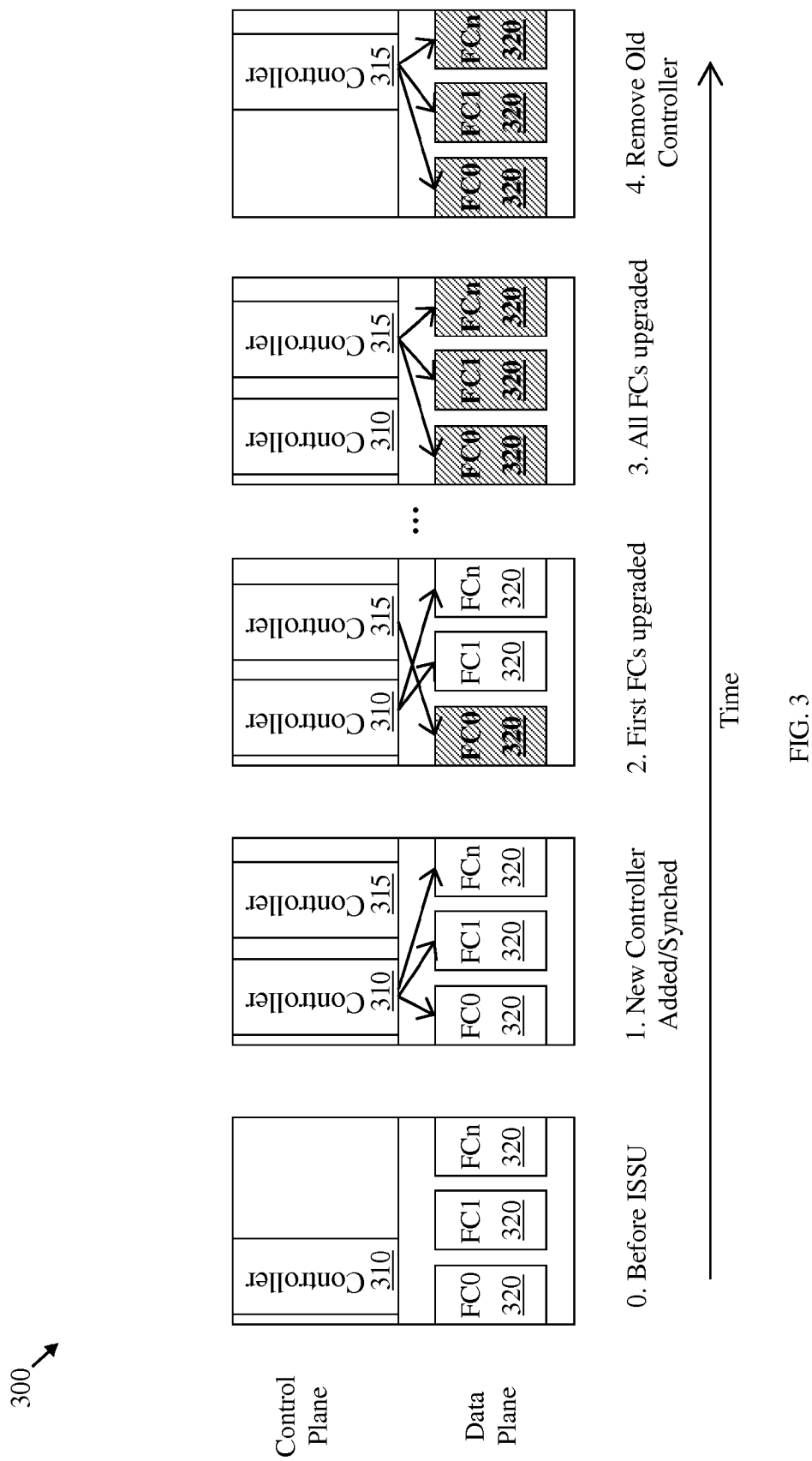
FIG. 3 illustrates another embodiment of an ISSU scheme for a multi-core forwarding architecture.

FIG. 3 illustrates an embodiment of another ISSU scheme 300 that may be implemented for a multi-core forwarding architecture, such as the multi-core forwarding architecture 100. The ISSU scheme 300 may be used to upgrade a controller 310 at a control plane and a plurality of FCs 320 at the data plane of the multi-core forwarding architecture. The controller 310 and the FCs 320 may be similar to the controller 110 and the FCs 120, respectively. The ISSU scheme 300 may achieve a nonstop ISSU where at least some of the FCs 320 may be handling, processing, and forwarding data or packets at any time during the ISSU.

Initially, a plurality of n+1 FCs 320 (labeled FC0 320, FC1 320, . . . , FCn 320) may be running prior to the ISSU. During the ISSU, the controller 310 and the FCs 320 may be upgraded (e.g., undergo software upgrade). To achieve a smooth controller and FC upgrade where packet processing and forwarding is not interrupted and no packet is lost, a new controller 315 with an upgrade controller software version may be introduced at the data plane during the ISSU. The new controller 315 may use any existing or supported methods to retrieve state information from the old controller 310. The new controller 315 may build its local forwarding tables and FC shared tables. When the ISSU scheme 300 begins, all the FCs 320 may be associated with (i.e. managed by) the old controller 310 and the new controller 315 may initially have no FCs 320 associated with it (stage 1 in FIG. 3).

After the new controller 315 is established and stabilized (ready to begin operation), the old controller 310 may start to set one FC 320 at a time offline (or few FCs 320 at a time if system resources allow it), which may be selected arbitrarily, based on its status, or according to a predetermined order. The selected FC 320 (e.g., FC0 320 in stage 2) may then stop packet processing and free its resources. The old controller 310 may then release its control of the selected FC 320. Using supported controller-to-controller communications, the new controller 315 may then take over the released FC 320, upgrade and bring up the forwarding process for the FC 320, allocate resources for the FC 320, and allow the newly loaded and upgraded FC 320 to start handling packets (stage 2 in FIG. 3). The FC upgrade steps of the ISSU schemes 300 may be similar to the FC upgrade steps of the FC scheme 200 by may be substantially implemented by the new controller 315 in the ISSU scheme 300.

Following the same procedure, all the FCs 320 that are controlled by the old controller 310 may be upgraded and associated with the new controller 315, e.g., one by one, until all the FCs 320 are upgraded and migrated from the old controller 310 to the new controller 315 (stage 3 in FIG. 3). After all the FCs 320 are upgraded and migrated, the old controller 310 (the old controller software version) may be removed along with its shared tables and resources (stage 4 in FIG. 3). The ISSU scheme 300 may provide a smooth or clean method for handling the shared resources. One resource that may be fixed and may not be released may be a packet input queue, which may be allocated at the system level. The ISSU scheme 300 may provide upgrade for the entire data plane, including the FCs 320 and other components and associated resources, or for the FCs 320 only in the data plane.

Figure 4:
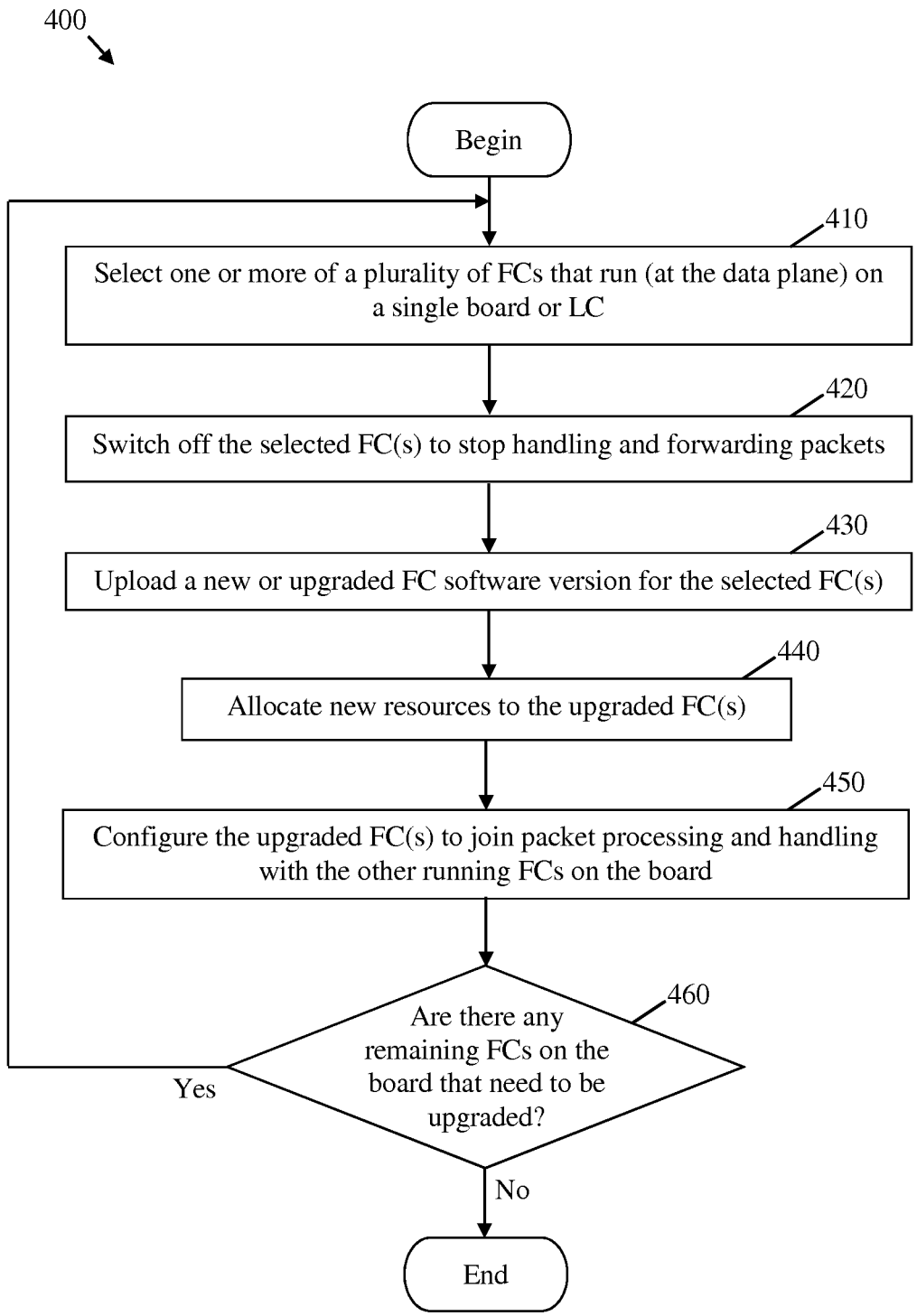
FIG. 4 is a flowchart of an embodiment of an ISSU method.

FIG. 4 illustrates an embodiment of an ISSU method 400 that may be implemented in a multi-core forwarding architecture, such as the multi-core forwarding architecture 100. For instance, the ISSU method 400 may be implemented as part of the ISSU scheme 200 or the ISSU scheme 300 by a forwarding component. The method 400 may begin at step or block 410, where one or more of a plurality of FCs that run (at the data plane) on a single board or LC may be selected for upgrading. For instance, a controller (e.g., controller 210) may select one or more of the FCs running on one or more CPUs of the board (e.g., FCs 220) to switch off and upgrade with a new or upgraded FC software version. More than one FC may be selected for upgrade at about the same time if the system resources (e.g., memory, processor(s), etc.) allow it. A FC may be selected arbitrarily, based on some criteria related to its operation status, e.g., an idle or lightly loaded FC, or in a predetermined order or sequence of the FCs on the board.

At block 420, the selected FC(s) may be switched off to stop handling and forwarding packets. As described above, the FC may be switched off in a smooth manner where the processing of pending packets in a buffer may be completed or the packets may be offloaded to other FCs before the FC is turned off, which may prevent packet loss. At block 430, a new or upgraded FC software version may be uploaded for the selected FC(s). At block 440, new resources may be allocated to the upgraded FC(s). The resources may include memory, CPU, and other system resources to enable packet processing and forwarding. At block 450, the upgraded FC(s) may be configured to join packet processing and handling with the other running FCs on the board.

At decision block 460, the method 400 may determine whether any remaining FCs on the board needs to be upgraded. For instance, the method 400 may determine whether all the FCs are upgraded with a new FC software version. If the condition in block 460 is met, i.e., there is one or more remaining FCs that need upgrading, then the method may return to block 410 to select one or more of the remaining FCs for upgrading. Otherwise, the method 400 may end. In other embodiments, a similar method comprising similar steps may be implemented to upgrade the FCs at the data plane and the controller at the control plane. This method may also comprise additional steps for adding a new controller (e.g., a new or upgraded controller software version) and reallocating the upgraded FCs, e.g., one by one, from the old controller (e.g., the old controller software version) to the new controller, and then removing the old controller and associated resources, as described in the ISSU scheme 300.

Figure 5:
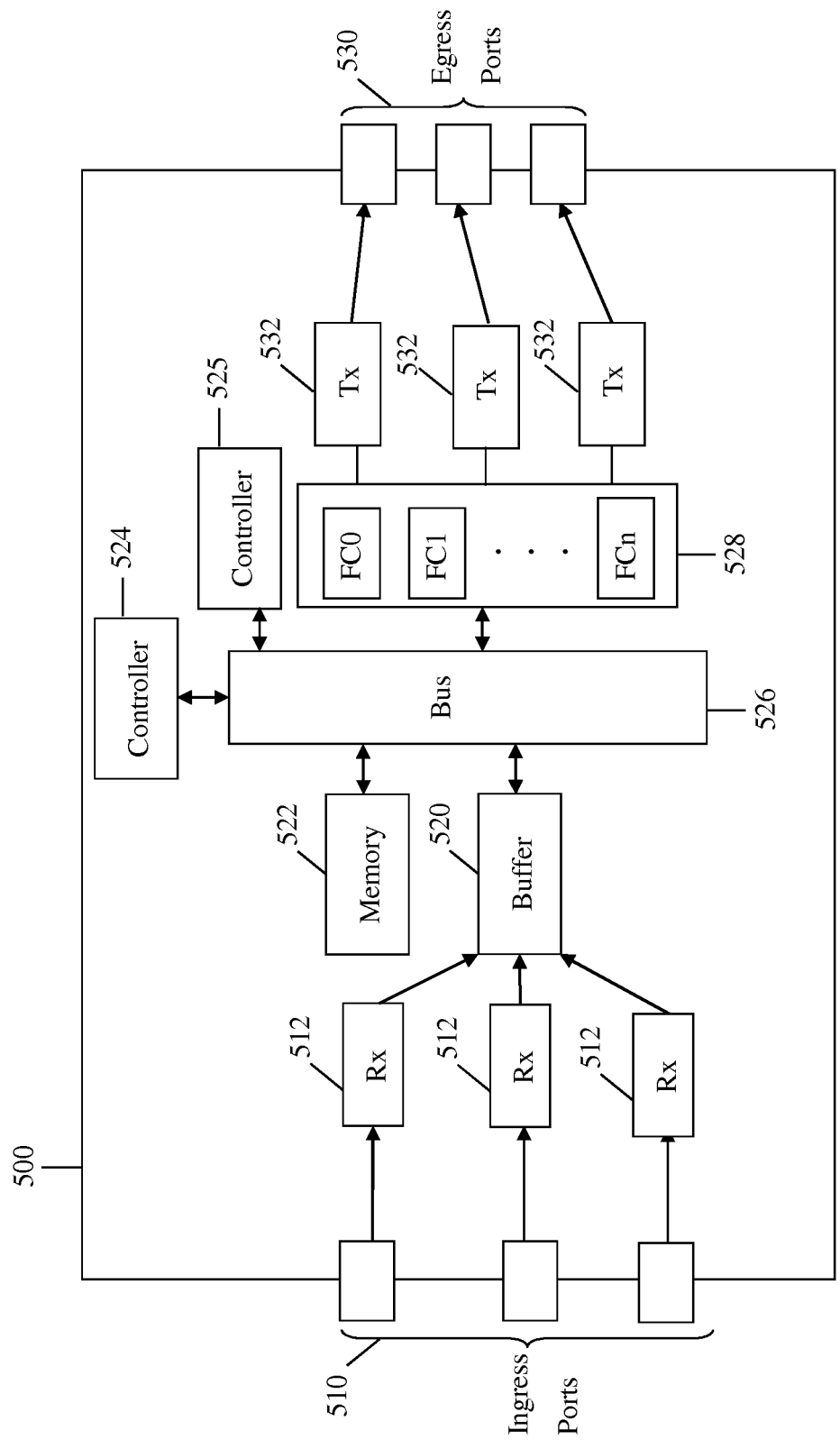
FIG. 5 is a schematic diagram of an embodiment of a printed circuit board.

FIG. 5 illustrates an embodiment of a printed circuit board 500 (referred to hereafter as a board) for implementing a multi-core forwarding architecture described herein, such as the multi-core forwarding architecture 100. The board 500 may comprise ingress ports 510, receivers (Rxs) 512, a shared buffer 520, a memory 522, a controller 524, a shared communication bus 526, a switching fabric 528 that includes forwarding cores FC0, FC1, . . . , FCN, transmitters (Txs) 532, and egress ports 530. Each of the ingress ports may be coupled to a receiver 512 as shown for receiving signals and packets/data from other network components, such as routers. Packets from each of the receivers may be stored in a shared buffer 520 for further processing. Packets from the buffer 520 may be transferred via the bus 526 to a switch fabric 528 comprising n+1 forwarding cores as shown. The memory 522 may store software for one or more upgrades to the forwarding cores shown. In addition, the memory 522 may provide software and data to configure the operation of the controller 524. The controller 524 may be a controller such as controller 210 described earlier. The controller 524 may communicate with the buffer 524 and the forwarding cores FC0, FC1, . . . , FCn via bus 526. The forwarding cores may transmit packets via transmitters 532, each of which may be coupled to an egress port 530. As discussed earlier, a selected forwarding core for upgrade may poll the packets from the buffer 520 until the selected forwarding core completes its own packet processing using the needed packets and subsequently stop its normal processing from the shared buffer. Consequently, there will be no dropped packets. Additionally, the board 500 may comprise a second controller 525 loaded with an upgraded software version of the software on the controller 524 in order to implement the ISSU scheme 300 discussed with respect to FIG. 3. The controller 524 and second controller 525 may be implemented on a single processor or may be implemented on separate processors.

Figure 6:
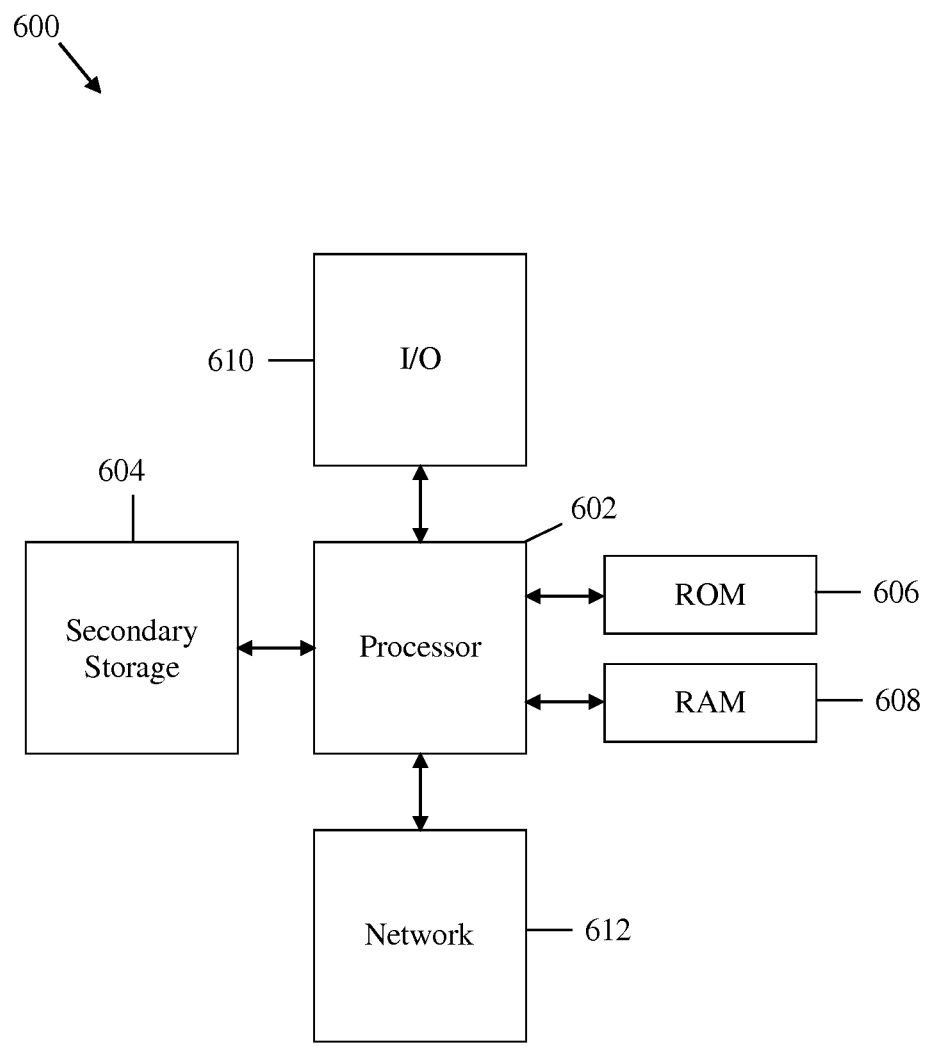
FIG. 6 is a schematic diagram of an embodiment of a general-purpose network component.

Although three ingress ports 510, three receivers 512, three transmitters, 532, and three egress ports 530 are shown in FIG. 5 for illustrative purposes, the board 500 may comprise any number of these elements. Furthermore, the bus 526 is optional as the controller 524, buffer 520, and switching fabric 528 may be hardwired to communicate directly with one another. The controller 524 and/or switching fabric 528 may be implemented via a processor that itself may be implemented as one or more central processing unit (CPU) chips, cores (e.g., a multi-core processor), field-programmable gate arrays (FPGAs), application specific integrated circuits (ASICs), and/or digital signal processors (DSPs). The controller 524 and forwarding cores FC0, FC1, . . . , FCn may be implemented in software on one or more processors. The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. For example, the network component 600 may comprise or be part of, located at or coupled to any of a router, network component, or server that comprises a multi-core forwarding architecture, such as the multi-core forwarding architecture 100. The network component 600 includes a processor 602 (which may be referred to as CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, cores (e.g., a multi-core processor), FPGAs, ASICs, and/or DSPs, and/or may be part of one or more ASICs. The processor 602 may be configured to implement any of the ISSU schemes and methods described above. For instance, the processor 602 may be configured (via hardware and/or software) to implement or support the schemes 200 and/or 300 and the method 400.

The secondary storage 604 is typically comprised of one or more disk drives or erasable programmable ROM (EPROM) and is used for non-volatile storage of data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

It is understood that by programming and/or loading executable instructions onto the board 500, at least one of the memory 522, controller 524, and the switching fabric 528 comprising forwarding cores FC0, FC1, . . . , FCn are changed, transforming the board 500 in part into a particular machine or apparatus, e.g., a multi-core forwarding architecture, having the novel functionality taught by the present disclosure. Similarly, it is understood that by programming and/or loading executable instructions onto the network component 600, at least one of the processor 602, the ROM 606, and the RAM 608 are changed, transforming the network component 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a network component for an in-service software upgrade (ISSU), the method comprising:
   forwarding a plurality of packets with a plurality of forwarding cores (FCs) implemented on a processor;
   selecting, using the network component, a first FC from the plurality of FCs for a software upgrade;
   resetting, using the network component, the first FC with the software upgrade without resetting at least one of the other FCs from the plurality of FCs implemented on the processor,
   wherein the at least one of the other FCs from the plurality of FCs forwards the packets when the selected FC is upgraded,
   transmitting a reset command to the first FC to stop at least one of the following: polling packets from a shared buffer by the first FC and responding to an input/output (IO) interrupt for the first FC; and
   offloading, using the network component, the packets allocated for the first FC from the shared buffer to the at least one of the other FCs,
   wherein the offloaded packets are queued in a high priority buffer that is accessed by the at least one of the other FCs for forwarding.

2. The method of claim 1, further comprising joining, using the network component, the first FC for packet forwarding after the software upgrade and sequentially selecting, using the network component, other FCs from the plurality of FCs for the software upgrade until there are no remaining FCs from the plurality of FCs that need to be upgraded.

3. The method of claim 2, wherein only one FC is selected for upgrade at a time while the other FCs are processing and forwarding the packets, wherein the processor is a multi-core processor, and wherein the FCs correspond to a plurality of cores within the processor.

4. The method of claim 2, wherein the first FC and the other FCs are selected for the software upgrade according to a predetermined sequence of the FCs, and wherein the processor is located within the line card.

5. The method of claim 1, wherein more than one of the FCs are selected for the software upgrade at about the same time while a plurality of unselected FCs from the plurality of FCs continue forwarding the packets.

6. The method of claim 1, wherein the first FC is selected for the software upgrade based on a packet load status of the first FC by a controller that runs at a control plane on a line card, and wherein the FCs forward the packets about simultaneously when the FCs are not reset for the software upgrade.

7. The method of claim 1, wherein the first FC is not forwarding the packets when resetting the first FC, and wherein the method further comprises switching control of the first FC from a controller to a second controller when resetting the first FC.

8. A network component comprising:
   a printed circuit board comprising a plurality of forwarding cores (FCs), wherein each of the FCs is configured to forward packets; and
   a processor coupled to the plurality of FCs and configured to:
   select a FC from the plurality of FCs;
   switch off the selected FC to stop forwarding packets, wherein the selected FC is instructed to offload at least some packets to a high priority buffer;
   upload an upgraded FC software version for the selected FC;
   reallocate a plurality of resources to the selected FC;

configure the selected FC to join packet forwarding with the other running FCs on the printed circuit board; and
switch on the selected FC after configuring the selected FC,
wherein at least one of the FCs that are not selected for the uploading of the upgraded FC software version is configured to forward packets from the high priority buffer while the selected FC is switched off, and
wherein the printed circuit board is configured as a line card.

9. The network component of claim 8, wherein more than one of the FCs within the printed circuit board are upgraded at about the same time, wherein the more than one of the FCs within the printed circuit board are upgraded at about the same time independently and without synchronization, and wherein the FCs are upgraded by selecting and switching off one or more of the FCs within the printed circuit board at a time without switching off the FCs.

10. The network component of claim 8, wherein the selected FC continues polling packets from a shared buffer, responding to an input/output (JO) interrupt for the FCs, or both to complete any necessary packet processing before switching off.

11. The network component of claim 8, further comprising a buffer coupled to each of the plurality of FCs, wherein the buffer is configured to store a plurality of packets for forwarding by the selected FC, and wherein any packets intended for the selected FC that existed in the buffer at the time the selected FC is switched off remain in the buffer until the selected FC is switched on.

12. The network component of claim 8, wherein a second processor located within the printed circuit board comprises at least some of the FCs, wherein the second processor is a multi-core processor, and wherein the some of the FCs correspond to different cores within the second processor.

13. The network component of claim 8, wherein the processor is further configured to manage the control plane of the printed circuit board and release control of the selected FC after switching off the selected FC to stop forwarding packets, and wherein a second controller configures the selected FC to join packet forwarding with the other running FCs on the printed circuit board when the processor releases control of the selected FC.

14. A network component comprising:
a printed circuit board comprising a plurality of forwarding cores (FCs), wherein each of the FCs is configured to forward packets; and
a processor coupled to the plurality of FCs and configured to:
select a FC from the plurality of FCs;
switch off the selected FC to stop forwarding packets;
upload an upgraded FC software version for the selected FC;
allocate new resources to the selected FC;
configure the selected FC to join packet forwarding with the other running FCs on the printed circuit board; and
switch on the selected FC after configuring the selected FC,
wherein at least one of the FCs is configured to forward packets while the selected FC is switched off,
wherein the selected FC stops polling packets from a shared buffer or responding to an input/output (IO) interrupt for the FCs before switching off,
wherein the selected FC offloads its packets from the shared buffer to the other running FCs for handling and forwarding before switching off, and
wherein the offloaded packets are queued in a high priority buffer that is accessed by the other running FCs for handling and forwarding.

15. An apparatus for an in-service software upgrade (ISSU), comprising:
a memory; and
a processor coupled to the memory, wherein the memory includes instructions that when executed by the processor cause the apparatus to perform the following:
receive a command to update software for a selected forwarding core (FC) from a plurality of FCs;
set the selected FC to offline to stop forwarding packets while other FCs from the plurality of FCs continue to forward the packets;
update a software for packet forwarding for the selected FC;
configure the selected FC to join packet forwarding with the other FCs from the plurality of FCs that are forwarding packets,
stop performing from one of the following: polling packets from a shared buffer for the selected FC and responding to an input/output (IO) interrupt for the selected FC before setting the selected FC offline; and
offload the selected FC packets from the shared buffer to the other FCs that are forwarding packets,
wherein the offloaded packets are queued in a high priority buffer that is accessed by the other running FCs for handling and forwarding.
wherein a line card of the apparatus comprises the FCs.

16. The apparatus of claim 15, wherein the processor is a multi-core processor that comprises a plurality of cores, wherein the FCs are implemented on the cores within the processor, and wherein the FCs are associated with the data plane of the line card.

17. The apparatus of claim 15, wherein the instructions when executed by the processor further cause the apparatus to:
implement a first controller with a first software version;
manage the control plane of the line card;
receive a command to update software for the first controller; and
migrate the FCs to a second controller after receiving the command.

18. The apparatus of claim 15, wherein the instructions, when executed by the processor, further cause the apparatus to implement a controller that manages the FCs, wherein the controller assists in releasing shared resources that were used by the selected FC before updating of the software, and wherein the update of the software for packet forwarding for the selected FC comprises rebooting and initializing the selected FC at a self-paced time.

* * * * *

UNITED STATES PATENT AND TRADEMARK OFFICE
CERTIFICATE OF CORRECTION

PATENT NO. : 9,030,947 B2  
APPLICATION NO. : 13/650363  
DATED : May 12, 2015  
INVENTOR(S) : Xu

Page 1 of 1

It is certified that error appears in the above-identified patent and that said Letters Patent is hereby corrected as shown below:

In the claims:

Column 11, Lines 19-23, Claim 10, should read:

The network component of claim 8, wherein the selected FC continues polling packets from a shared buffer, responding to an input/output (IO) interrupt for the FCs, or both to complete any necessary packet processing before switching off.

Signed and Sealed this  
Twenty-second Day of March, 2016

Michelle K. Lee  
*Director of the United States Patent and Trademark Office*